May 21, 1968 L. J. GROVE 3,383,729
TANK CLEANER
Filed Nov. 22, 1966 2 Sheets-Sheet 1
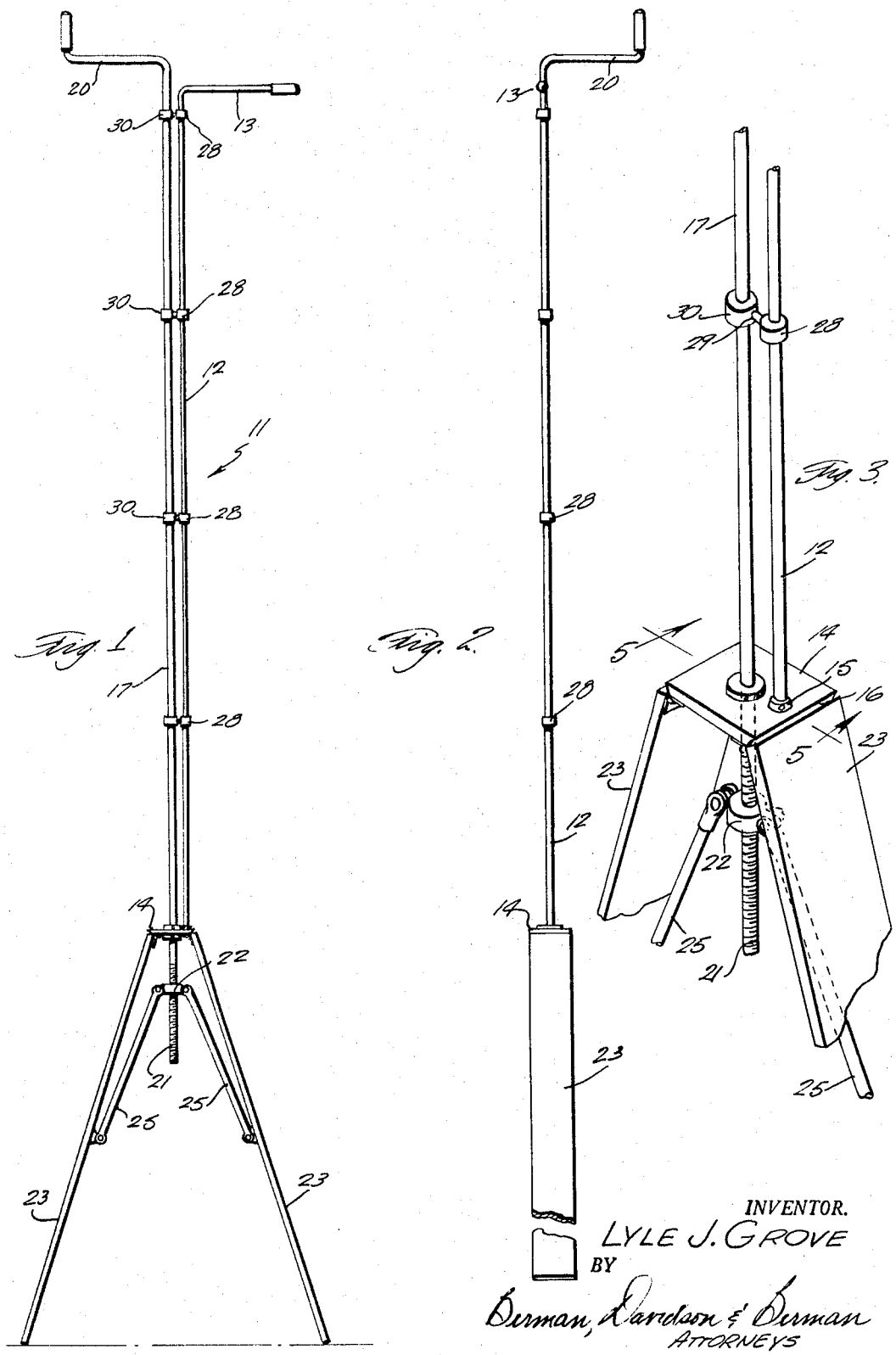
INVENTOR.
LYLE J. GROVE
BY
Berman, Davidson & Berman
ATTORNEYS May 21, 1968
L. J. GROVE
3,383,729
TANK CLEANER
Filed Nov. 22, 1966
2 Sheets-Sheet 2
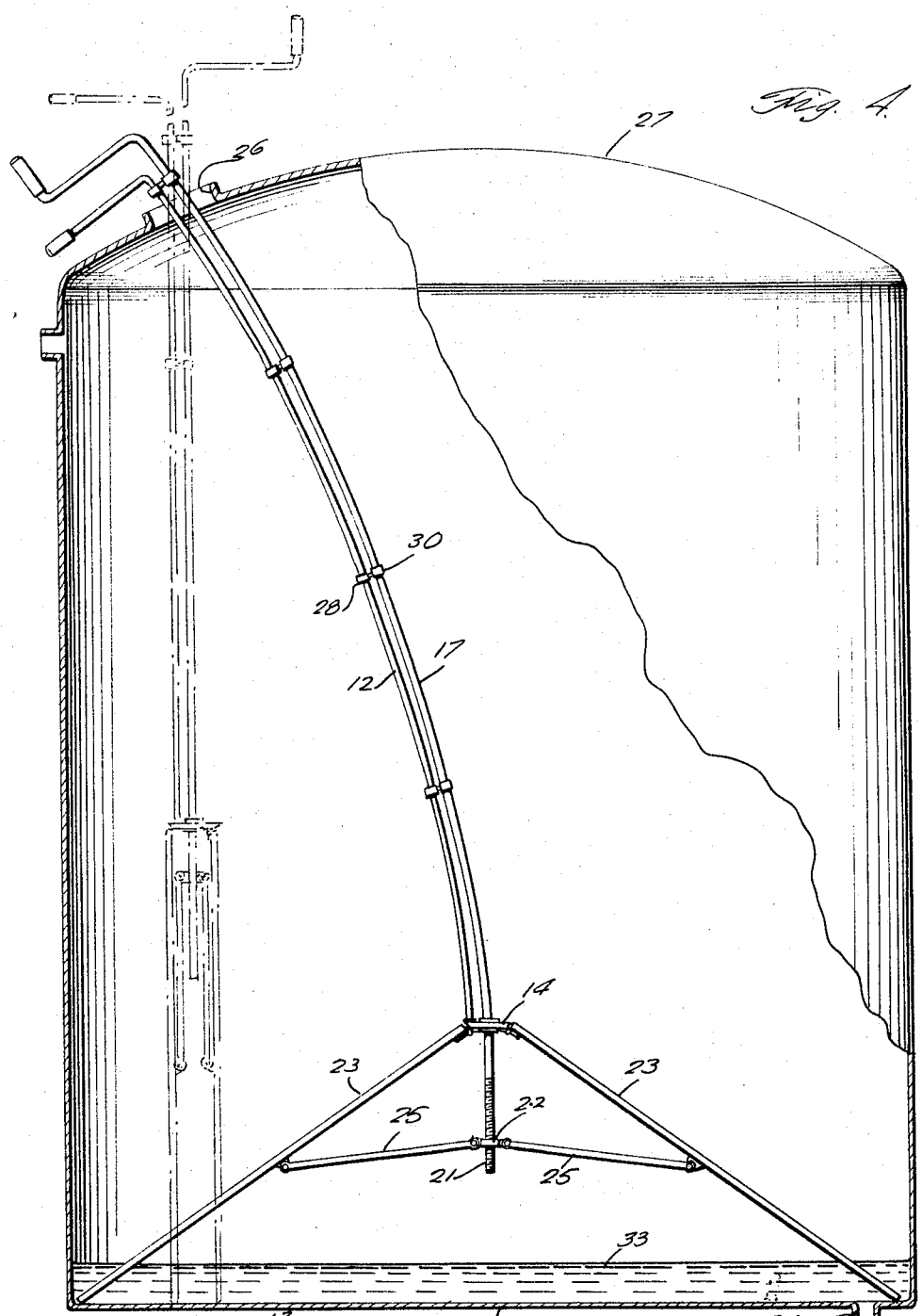
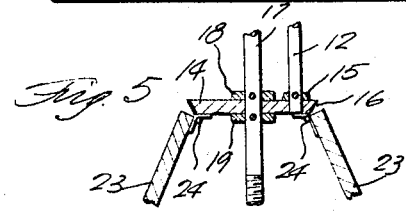
INVENTOR.
LYLE J. GROVE
BY
Berman, Davidson & Berman
ATTORNEYS 3,383,729
TANK CLEANER
Lyle J. Grove, Box 337, Coyle, Okla. 73027
Filed Nov. 22, 1966, Ser. No. 596,112
4 Claims. (Cl. 15—246.5)

ABSTRACT OF THE DISCLOSURE

A tank cleaning tool consisting of a flexible supporting rod secured to a plate and a flexible crank rod swiveled in the plate, the rods being retained in parallel relation by spaced connectors, with the crank rod rotatable relative to the connectors. Opposed sweep arms are hinged to the plate and are linked to a nut threaded on the crank rod below the plate.

---

This invention relates to devices for clearing out oil tanks, and more particularly to an improved implement for clearing out the bottom settlings and other residue from the bottom of an oil-storage tank in an efficient and economical manner.

A main object of the invention is to provide a novel and improved cleaning tool adapted to enter the top opening of a conventional oil-storage tank and providing a sweeping action across the bottom of the tank, thereby pushing bottom settlings toward a discharge opening provided in the bottom of the tank, usually at one side thereof, from which the swept-out settlings and other residue material may be pumped to a heat treater or other suitable processing means for proper processing to retrieve the usable material thereof, the apparatus being relatively simple in construction, being easy to operate, and providing a considerable saving in the cost of cleaning a tank, as compared with the devices and methods heretofore employed for this purpose.

A further object of the invention is to provide an improved oil tank-cleaning tool which is relatively inexpensive to fabricate, which is durable in construction, which is light in weight, which is designed so that it can be folded to a relatively small collapsed size, so that it may be inserted through the top opening of a conventional oil-storage tank, and which can be readily manipulated by a single individual to thoroughly and efficiently clear out the bottom of an oil tank and to sweep out bottom settlings or other accumulated residue therefrom.

Further objects and advantages of the invention will become apparent from the following description and claims, and from the accompanying drawings, wherein:

FIGURE 1 is an elevational view of an improved tank-cleaning tool constructed in accordance with the present invention, shown with the sweeper arms thereof in partly extended positions.

FIGURE 2 is a side view of the implement of FIGURE 1.

FIGURE 3 is an enlarged fragmentary perspective view of the portion of the implement of FIGURES 1 and 2 adjacent to the sweeper arm-supporting plate thereof.

FIGURE 4 is an elevational view, partly in vertical cross-section, of a conventional oil-storage tank into which an implement such as that shown in FIGURES 1 to 3 has been inserted, with the sweeper arms of the implement shown in fully-expanded positions on the bottom of the tank, and illustrating the flexibility of the crank rod and supporting rod of the implement.

FIGURE 5 is a fragmentary vertical cross-sectional view taken substantially on the line 5—5 of FIGURE 3.

Referring to the drawings, 11 generally designates an improved tank-cleaning tool constructed in accordance with the present invention. The tool 11 comprises an elongated supporting rod 12 provided at its top end with an outwardly-projecting handlebar portion 13. The bottom end of the supporting rod 12 is rigidly-secured to a plate member 14, the rod 12 being substantially perpendicular to the plate member, as shown in FIGURE 5. Thus, the plate member 14 may be provided with a receiving boss or collar portion 15 adjacent one end edge 16 thereof, and the bottom end of the rod 12 may be received in the collar or socket element 15 and rigidly-secured therein in any suitable manner.

Designated at 17 is an elongated crank rod which extends through the central portion of the plate member 14 and is rotatably-secured thereto, as by the provision of collars 18 and 19 secured on the crank rod 17 above and below the plate member 14, as shown in FIGURE 5. Thus, the collars 18 and 19 serve as means restraining the crank rod against lengthwise movement relative to the plate member 14.

The crank rod 17 is provided at its top end with an outwardly-extending crank handle 20 and is provided with threads 21 on its bottom end portion. Threadedly-engaged on the threaded bottom end portion of crank rod 17 is a nut member 22. Respective depending elongated, generally rectangular sweeper arms 23, 23 are hingedly-connected at 24, 24 to the opposite end edges 16 of the plate member 14. Respective link rods 25, 25 connect the nut member 22 to the intermediate portions of the depending sweeper arms 23. Thus, by rotating the crank rod 17 in one direction, the nut member 22 may be retracted, namely, may be moved upwardly, as viewed in FIGURE 1, whereby the depending elongated sweeper arms 23, 23 are moved inwardly toward each other, for example, to the dotted-view positions thereof shown in FIGURE 4. This reduces the horizontal cross-sectional size of the implement to a degree such that the implement may be passed through the relatively small top opening 26 of a conventional oil-storage tank 27, in a manner presently to be described.

Rigidly-secured to the support rod 12 at spaced locations therealong are a plurality of collar members 28, each collar member 28 being provided with an outwardly-projecting radial arm 29 rigidly-secured to a bearing ring or collar member 30. The crank rod 17 extends rotatably through and is supported by the bearing ring elements 30, and is thus maintained in substantially parallel spaced relationship to the supporting rod 12.

The rod members 17 and 12 are preferably made of relatively flexible rod material, such as flexible steel, or the like. Obviously, any other suitable flexible rod material may be employed in fabricating the rod members 12 and 17.

In using the tool, it is folded to the position thereof shown in dotted view in FIGURE 4 and inserted through the top opening 26 of an oil tank 27, being lowered therethrough until the bottom ends of the sweeper boards 23, 23 rest on the bottom wall 32 of the tank. The residue 33 in the bottom of the tank is then progressively swept out by urging it toward the waste-discharge opening 34 thereof by rotating crank rod 17 in a direction to lower the nut member 22 on the threads 21, whereby to expand the sweeper boards 23, 23. As the boards 23, 23 expand, one board engages a bottom corner of the tank opposite the waste-discharge opening 34, as shown in FIGURE 4, and the other board moves in the direction of the opposite side of the tank, for example, toward the opening 34 in the position of the implement illustrated in FIGURE 4. The flexibility of the rods 12 and 17 allows them to bend readily, for example, to the maximum curvatures thereof illustrated in FIGURE 4, without interfering appreciably with the expansion of the sweeper boards 23, 23. By successively adjusting the position of the implement, the major part of the material 33 in the bottom of the tank may be pushed toward the region immediately above the waste-discharge opening 34, whereby the material may be pumped out of the opening 34 and transferred to a suitable heat-treating device for retrieval of the useful material therein. The recovered oil may be returned to another storage tank 27 as good oil.

It will be noted that the implement can be operated by a single individual, one hand being employed to grasp the handlebar 13, while the other hand is employed to rotate the crank handle 20. With a small amount of practice, an operator can use the implement to rapidly clear out the settled bottom material 33 from a tank with a relatively small amount of effort.

In a typical embodiment of the invention, the sweeper boards 23, 23 were six inches wide and five feet long, and the plate member 14 was seven inches long and five inches wide. With these dimensions, the folded device could be readily inserted through the standard nine-inch opening 26 of a conventional oil-storage tank 27.

While the implement disclosed in the drawings is arranged for manual operation, within the spirit of the present invention the tool may be readily adapted for operation by hydraulic power, electric motor-drive means, a gasoline engine, or by any other suitable mechanical driving means, such as by a spring-loaded shaft or a spring motor.

While a specific embodiment of an improved tank-cleaning implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tank cleaner comprising an elongated support rod, plate means secured to one end of said support rod, a crank rod closely adjacent to said support rod and rotatably-engaged through said plate means, means restraining said crank rod against lengthwise movement relative to said plate means, means holding said crank rod in substantially parallel relation to said support rod, nut means threadedly-engaged on the bottom end portion of said crank rod, respective depending sweeper arms hingedly-connected at their top ends to spaced edge portions of said plate means, and means connecting said nut means to said sweeper arms for expanding and retracting said sweeper arms relative to each other responsive to rotation of said crank rod, wherein the means holding the crank rod substantially parallel to the support rod comprises a plurality of collar members secured to spaced portions of said support rod, and respective arms on said collar members having end portions rotatably-receiving and supporting said crank rod.

2. The tank cleaner of claim 1, and wherein said support rod and crank rod are of relatively flexible material.

3. The tank cleaner of claim 2, and wherein said sweeper arms comprise relatively wide elongated depending rectangular boards hinged at their top ends to the opposite edge portions of said plate means.

4. The tank cleaner of claim 3, and wherein said support rod is provided at its top end with an outwardly-projecting handlebar and said crank rod is provided at its top end with an outwardly-projecting crank handle.

References Cited

UNITED STATES PATENTS

| | | | |
|---|---|---|---|
| 518,638 | 4/1894 | Weston | 15—104.18 |
| 1,303,365 | 5/1919 | Myres | 15—212 |
| 2,077,731 | 4/1937 | Aaby | 15—243 |

FOREIGN PATENTS 147,223  10/1962  U.S.S.R.

CHARLES A. WILLMUTH, *Primary Examiner.*

L. G. MACHLIN, *Assistant Examiner.*